(12) United States Patent
Iwanaga

(10) Patent No.: US 9,235,940 B2
(45) Date of Patent: Jan. 12, 2016

(54) IN-VEHICLE CHARGER

(75) Inventor: Izumi Iwanaga, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 244 days.

(21) Appl. No.: 14/006,509

(22) PCT Filed: Aug. 24, 2012

(86) PCT No.: PCT/JP2012/005342
§ 371 (c)(1),
(2), (4) Date: Sep. 20, 2013

(87) PCT Pub. No.: WO2013/031166
PCT Pub. Date: Mar. 7, 2013

(65) Prior Publication Data
US 2014/0009261 A1    Jan. 9, 2014

(30) Foreign Application Priority Data

Aug. 26, 2011 (JP) .................................. 2011-184414
Aug. 26, 2011 (JP) .................................. 2011-184415

(51) Int. Cl.
*E05B 19/00* (2006.01)
*B60R 25/00* (2013.01)
(Continued)

(52) U.S. Cl.
CPC .......... *G07C 9/00111* (2013.01); *B60R 25/406* (2013.01); *H02J 7/025* (2013.01)

(58) Field of Classification Search
CPC ..... G07C 9/00111; E05B 19/00; E05B 49/00; B60R 25/00

USPC ........... 340/5.32, 5.64, 5.3; 320/101; 136/291
See application file for complete search history.

(56) References Cited

U.S. PATENT DOCUMENTS 5,696,485 A   12/1997  Treharne
6,650,086 B1 * 11/2003  Chang .................. H01M 2/342
                                                          320/105
(Continued)

FOREIGN PATENT DOCUMENTS

CN      101872523       10/2010
DE   10 2004 023 197    12/2005
(Continued)

OTHER PUBLICATIONS

Japanese Translation of the JP 2009-148108A, Masaki Matsumoto, by Advanced Industrial Property Networks on Jun. 27, 2015.*
(Continued)

*Primary Examiner* — Nam V Nguyen
(74) *Attorney, Agent, or Firm* — Wenderoth, Lind & Ponack, L.L.P.

(57) ABSTRACT

An in-vehicle charger includes a charger that charges a device to be charged including a wireless key of a keyless entry device, a controller connected to the charger, and a detection unit connected to the controller and that detects an installation state of the device to be charged relative to the charger. The controller turns on power supply to the charger and controls the keyless entry device to perform first communication verification when the installation state of the device to be charged relative to the charger is detected by the detection unit. The controller turns on the power supply to the charger when it is determined that the communication verification of the keyless entry device has been performed.

5 Claims, 4 Drawing Sheets

(51) Int. Cl.
*H01M 10/44* (2006.01)
*H01M 10/46* (2006.01)
*G07C 9/00* (2006.01)
*H02J 7/02* (2006.01)
*B60R 25/40* (2013.01)

(56) References Cited

U.S. PATENT DOCUMENTS

| | | | |
|---|---|---|---|
| 7,514,899 B2* | 4/2009 | Deng-Peng | 320/101 |
| 8,386,090 B1* | 2/2013 | Hobbs et al. | 701/2 |
| 8,519,562 B2* | 8/2013 | Gibbs | G01R 31/045 307/9.1 |
| 8,929,957 B2* | 1/2015 | Toncich et al. | 455/573 |
| 9,035,606 B2* | 5/2015 | Ross | H02J 7/0042 320/109 |
| 2006/0184705 A1* | 8/2006 | Nakajima | 710/303 |
| 2008/0007212 A1* | 1/2008 | Theytaz | H02J 7/0013 320/107 |
| 2008/0211455 A1* | 9/2008 | Park et al. | 320/108 |
| 2010/0151808 A1 | 6/2010 | Toncich et al. | |
| 2010/0271192 A1 | 10/2010 | Mituta | |
| 2013/0307474 A1* | 11/2013 | Shimura et al. | 320/108 |
| 2013/0345932 A1* | 12/2013 | Iwanaga et al. | 701/36 |

FOREIGN PATENT DOCUMENTS

| | | | | |
|---|---|---|---|---|
| GB | 2 372 534 A | * | 8/2002 | E05B 19/00 |
| JP | 10-215204 A | | 8/1998 | |
| JP | 2005-179948 A | | 7/2005 | |
| JP | 2007-284981 | | 11/2007 | |
| JP | 2009-148108 A | * | 7/2009 | H02J 7/00 |
| JP | 2009-203641 A | | 9/2009 | |
| JP | 2009-296780 A | | 12/2009 | |
| JP | 2010-132233 A | | 6/2010 | |
| WO | WO 2010/060062 A1 | | 5/2010 | |

OTHER PUBLICATIONS

International Search Report for PCT/JP2012/005342, Nov. 13, 2012.

* cited by examiner

IN-VEHICLE CHARGER

TECHNICAL FIELD

The present invention relates to an in-vehicle charger to be mounted to a vehicle.

BACKGROUND ART

With the widespread use of mobile devices, an in-vehicle charger has been suggested which allows the mobile devices to be charged also in a vehicle (see Patent Document 1, for example).

Specifically, the in-vehicle charger includes a case whose one face is an opening, a lid which covers the opening of the case in an openable/closable manner and a charging coil which is disposed in an inner surface portion of the case opposite to the lid.

When the mobile device is charged using the in-vehicle charger, power is supplied by magnetic flux in such a way that the mobile device is accommodated in the case and the charging coil of the in-vehicle charger and a charging coil of the mobile device are placed to face each other.

RELATED ART DOCUMENTS

Patent Document

Patent Document 1: JP-A-2009-296780

SUMMARY OF THE INVENTION

Problems to be Solved by the Invention

In the related art above described, there is a possibility that the reliability of a vehicle control, for example, an open/close control of a door is decreased.

Specifically, the vehicles in recent years perform a so-called keyless entry control in order to open/close the door. In this keyless entry control, the opening/closing of the door is performed by the wireless communication between a wireless key (a remote control key) and a transceiver of a vehicle.

In this case, when the mobile device is charged in the vehicle by the in-vehicle charger, electromagnetic waves emitted from a charging coil thereof affect the wireless communication between the wireless key and the transceiver of the vehicle. As a result, there is a possibility that the reliability of the open/close control of the door is decreased.

Particularly, such a situation may be noticeable when the wireless key is charged by the in-vehicle charger.

Accordingly, an object of the present invention is to prevent a decrease in the reliability of a vehicle control.

Means for Solving the Problems

The present invention provides an in-vehicle charger including: a charger that charges a device to be charged including a wireless key of a keyless entry device; a controller connected to the charger; and a detection unit connected to the controller and that detects an installation state of the device to be charged relative to the charger, and wherein the controller turns on power supply to the charger and controls the keyless entry device to perform first communication verification when the installation state of the device to be charged relative to the charger is detected by the detection unit; wherein the controller turns on the power supply to the charger when it is determined that the communication verification of the keyless entry device has been performed. By this configuration, the above purpose can be achieved.

Also present invention provides an in-vehicle charger including: a charger that charges a device to be charged including a wireless key of a keyless entry device; a controller connected to the charger; and a detection unit connected to the controller and that detects an installation state of the device to be charged relative to the charger, and wherein the controller turns on power supply to the charger and controls the keyless entry device to perform first communication verification when the installation state of the device to be charged relative to the charger is detected by the detection unit; wherein the controller turns off the power supply to the charger when it is determined that the communication verification of the keyless entry device has not been performed. After that, the controller turns on the power supply to the charger when a vehicle movement state is detected, in a case where it is determined by the second communication verification of the keyless entry device that the communication verification of the keyless entry device has been performed. By this configuration, the above purpose can be achieved.

Advantageous Effects of the Invention

According to the present invention, an effect to prevent a decrease in the reliability of a vehicle control can be obtained.

MODE FOR CARRYING OUT THE INVENTION

Figure 1:
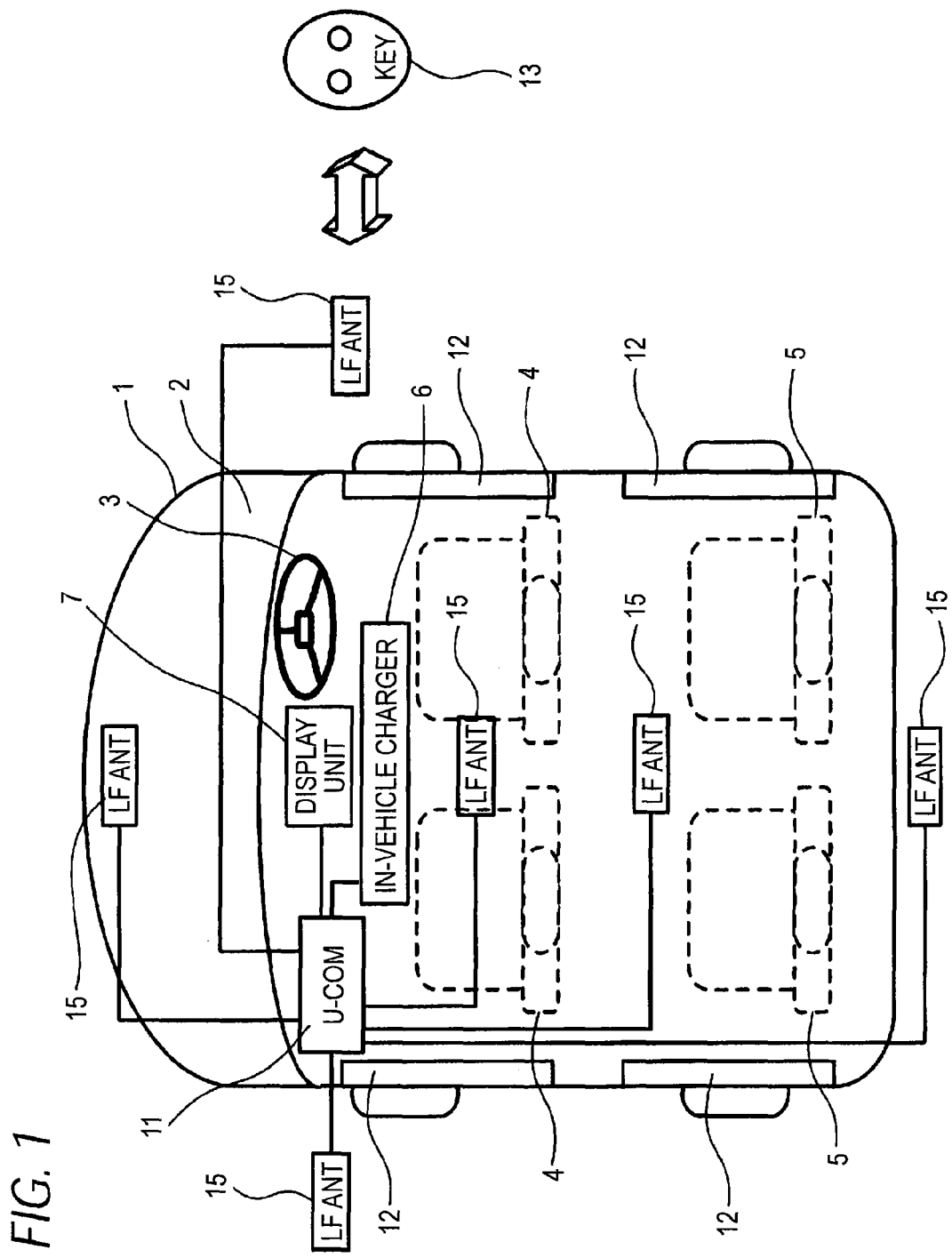
FIG. 1 is a view showing an in-vehicle charger according to a first embodiment of the present invention in the state of being mounted to a vehicle.

A first aspect of the present invention is to provide an in-vehicle charger which includes a charger configured to charge a device to be charged including a wireless key of a keyless entry device, a controller connected to the charger and a detection unit connected to the controller and configured to detect an installation state of the device to be charged relative to the charger part. The controller turns on the power supply to the charger and causes the keyless entry device to perform first communication verification when the installation state of the device to be charged relative to the charger part is detected by the detection unit. The controller turns on the power supply to the charger when it is determined that the communication verification of the keyless entry device can be performed. Thereby, it is possible to prevent the decrease in the reliability of a vehicle control.

That is, the controller turns on the power supply to the charger and causes the keyless entry device to perform the first communication verification when the installation state of the device to be charged relative to the charger part is detected by the detection unit and the controller turns on the power supply to the charger when it is determined that the communication verification of the keyless entry device can be performed. By turning on the power supply to the charger when the communication verification can be performed, the communication failure of the keyless entry device does not occur. As a result, it is possible to prevent the decrease in the reliability of a vehicle control.

A second aspect of the present invention is to provide an in-vehicle charger which includes a charger configured to charge a device to be charged including a wireless key of a keyless entry device, a controller connected to the charger and a detection unit connected to the controller and configured to detect an installation state of the device to be charged relative to the charger part. The controller turns on the power supply to the charger and causes the keyless entry device to perform first communication verification when the installation state of the device to be charged relative to the charger part is detected by the detection unit. The controller turns off the power supply to the charger when it is determined that the communication verification of the keyless entry device cannot be performed and then causes the keyless entry device to perform second communication verification. The controller turns on the power supply to the charger when a vehicle movement state is detected, in a case where it is determined that the communication verification of the keyless entry device can be performed. Thereby, it is possible to prevent the decrease in the reliability of a vehicle control.

That is, the controller turns off the power supply to the charger from an on-state and then causes the keyless entry device to perform the second communication verification. When it is determined that the communication verification of the keyless entry device can be performed, it is determined that the communication failure of the keyless entry device is caused due to the wireless key (as a device to be charged) in a state of being charged.

Therefore, in the subsequent charging operation, the power supply to the charger is turned on only when the keyless entry device cannot be operated, in a case where a vehicle movement state is detected (during operation), that is, where the vehicle is running.

That is, since the wireless key is not charged when an opening/closing of the door or a starting of an engine or the like is performed during stopping of a vehicle, the operation failure of the keyless entry device does not occur. As a result, it is possible to prevent the decrease in the reliability of a vehicle control.

Hereinafter, an illustrative embodiment of the present invention will be described with reference to the drawings.

First Embodiment

By referring to FIG. 1, a reference numeral 1 denotes a vehicle body. And, a steering wheel 3 is arranged in the front of a vehicle interior 2 of the vehicle body 1 and front seats 4 and rear seats 5 are arranged in the rear of the steering wheel 3.

Further, an in-vehicle charger 6 is arranged on the left side of the steering wheel 3 in the vehicle interior 2 and a display unit 7 is disposed above the in-vehicle charger 6.

Figure 2:
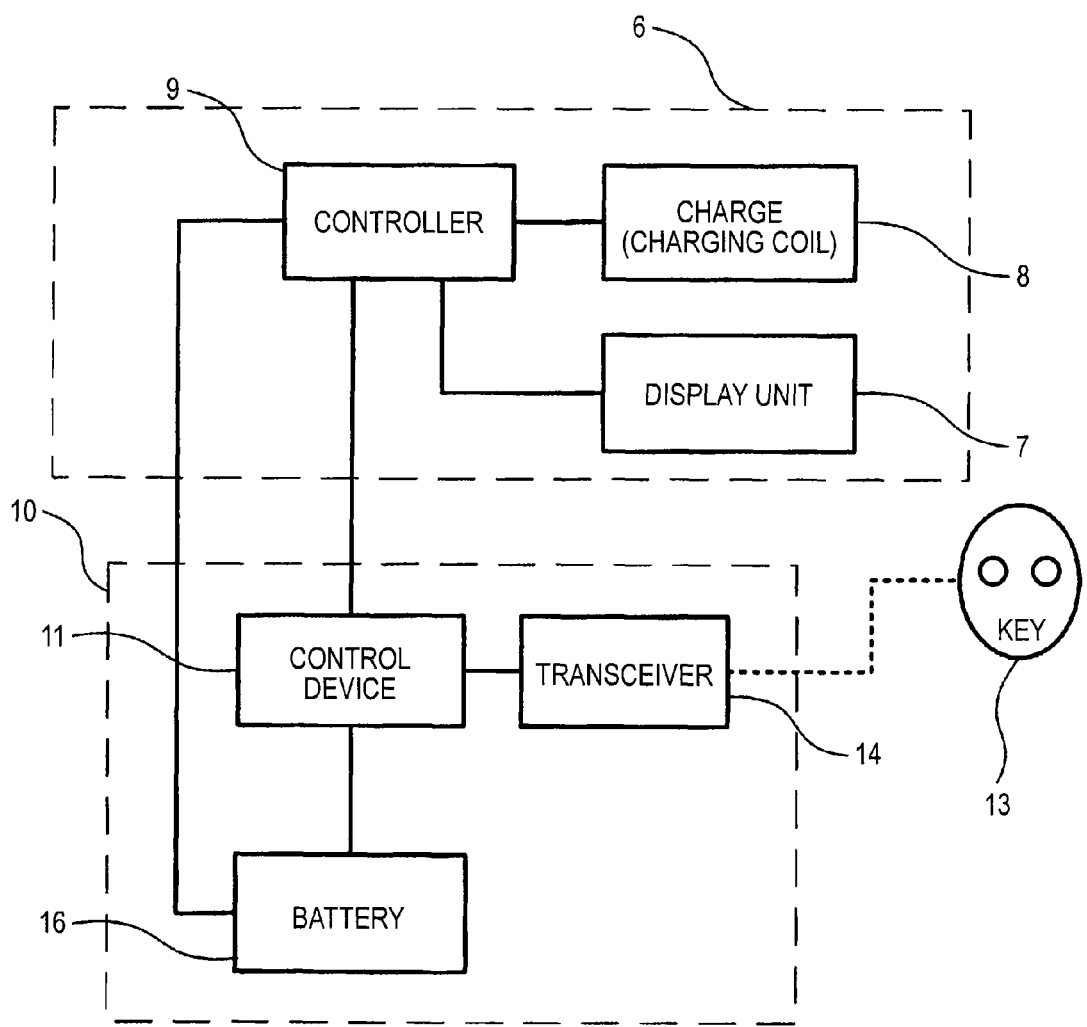
FIG. 2 is a control block diagram of the vehicle according to the first embodiment.

As shown in FIG. 2, the in-vehicle charger 6 includes a charger 8, the display unit 7 and a controller 9 connected to the charger 8 and the display unit 7. The charger 8 charges a mobile device such as a mobile phone which is an example of a device to be charged.

That is, the in-vehicle charger 6 charges the mobile device or the like in a non-contact manner by magnetic flux emitted from a charging coil of the charger 8.

Further, a control device (U-COM) 11 of a keyless entry device 10 is connected to the controller 9 of the in-vehicle charger 6.

The keyless entry device 10 is adapted to lock or unlock a door 12 shown in FIG. 1 by a wireless key 13. A transceiver 14 is connected to the control device 11 of the keyless entry device and communicates with the wireless key 13.

Further, antennas (LF ANT) 15 connected to the transceiver 14 are disposed on the vehicle interior 2 and a vehicle exterior.

Here, a battery 16 shown in FIG. 2 supplies power to each component.

By above configuration, the in-vehicle charger 6 can be used to charge the mobile device (which is an example of a device to be charged) in the vehicle interior 2. In the present embodiment, it is assumed that the wireless key 13 of the keyless entry device 10 is charged, as an example of the mobile device. When the wireless key 13 of the keyless entry device 10 is charged, the wireless key 13 is opposed to the charger 8 of the in-vehicle charger 6. The charger 8 includes a detection unit to detect an installation state of the device (the wireless key 13 as an example of mobile device in this present embodiment) to be charged.

Figure 3:
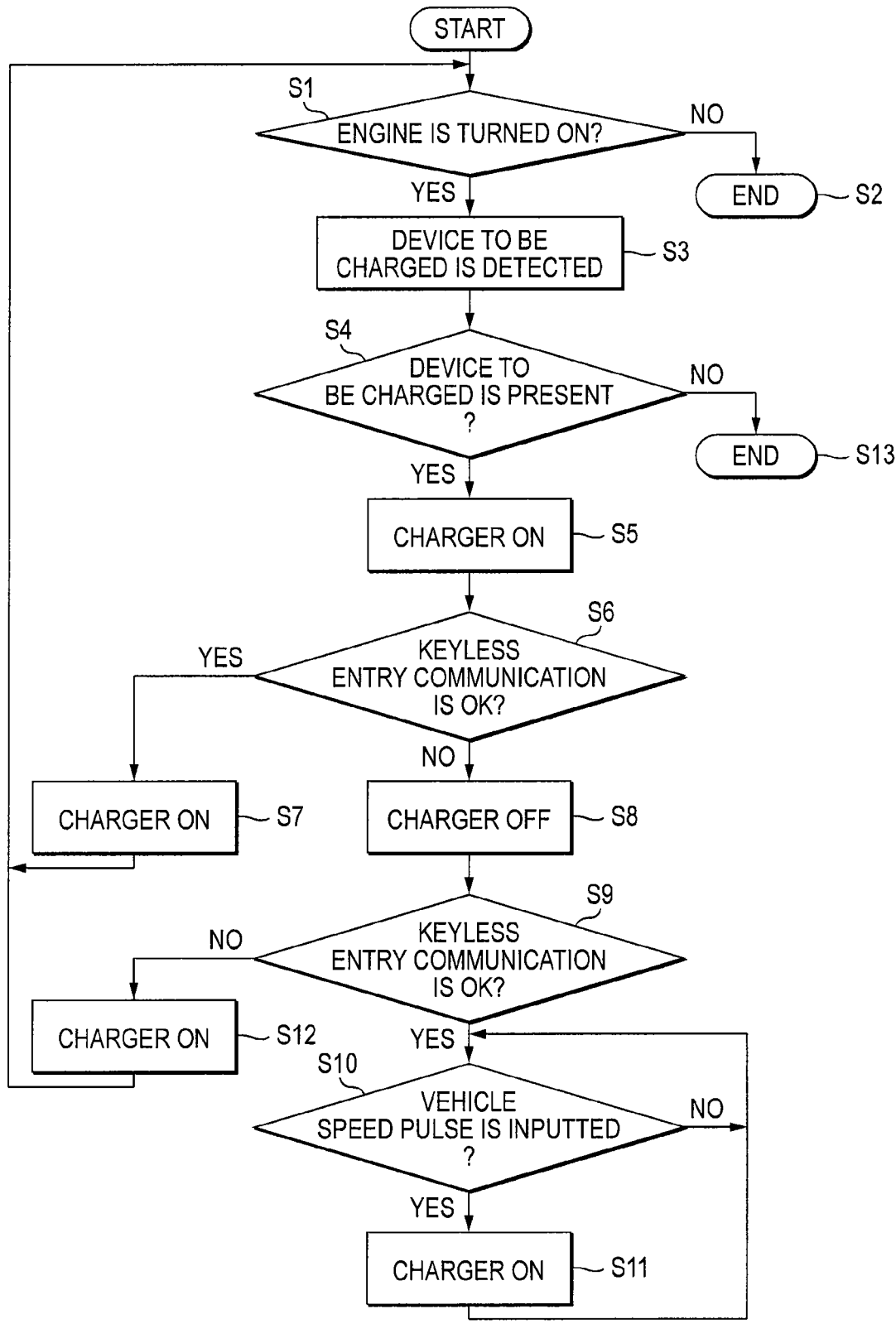
FIG. 3 is a flowchart showing an operation of the in-vehicle charger according to the first embodiment.

In this case, the controller 9 of the in-vehicle charger 6 first obtains starting information of an engine from the control device 11 of the keyless entry device 10 (S1 in FIG. 3).

At this time, when the engine is not running, the wireless key 13 cannot be charged using the in-vehicle charger 6 and the process is ended (S2 in FIG. 3).

In contrast, when the engine is running, the charger 8 of the in-vehicle charger 6 detects an installation state of the device (the wireless key 13 as an example of mobile device in this present embodiment) to be charged relative to the charger 8 part by a detection unit (S3 in FIG. 3).

For example, the detection unit includes elongated loop-shaped position detection coils at predetermined intervals on X axis and Y axis and a pulse signal is inputted to the positional detection coils at a predetermined timing. The position detection coil to which the pulse signal is inputted excites a charging coil of the charger 8 when the mobile device (as an example of the device to be charged) is opposed to the charger 8. The excited charging coil outputs an echo signal to the position detection coil by energy of current flowing therethrough. In this way, the detection unit is configured to detect approaching of the charging coil to the position detection coil and a placing position of the charging coil on the detection unit.

When it is determined by the above detection that the mobile device (as an example of the device to be charged) is opposed to the charger 8 (YES in S4 of FIG. 3), the controller 9 of the in-vehicle charger 6 turns on the power supply to the charger 8 (S5 in FIG. 3) and issues an instruction to causes the keyless entry device 10 to perform first communication verification. By doing so, the controller 9 determines whether the communication by the keyless entry device 10 is normally performed or not (S6 in FIG. 3).

Then, the communication between the keyless entry device 10 and the wireless key 11 is performed by the control device 11 of the keyless entry device 10.

When it is determined that the communication verification of the keyless entry device 10 can be performed (YES in S6 of FIG. 3), the controller 9 of the in-vehicle charger 6 turns on the power supply to the charger 8 (S7 in FIG. 3).

That is, since it is verified by the communication verification operation that an operation failure of the keyless entry device 10 does not occur even when the mobile device such as the wireless key 13 is charged using the charger 8 of the in-vehicle charger 6, such a charging is continuously performed by instruction of the controller 9.

In contrast, when it is determined that the communication verification of the keyless entry device 10 cannot be performed (NO in S6 of FIG. 3), the following process is performed. Specifically, when it is determined that the communication of the keyless entry device 10 is not normally performed and thus the communication verification cannot be performed even though the communication between the keyless entry device 10 and the wireless key 13 has been performed by the control device 11 of the keyless entry device 10, the controller 9 of the in-vehicle charger 6 turns off the power supply to the charger 8 (S8 in FIG. 3).

That is, since it is verified that the operation failure of the keyless entry device 10 occurs when the mobile device (as an example of the device to be charged) such as the wireless key 13 is charged using the charger 8 of the in-vehicle charger 6, the controller 9 turns off such a charging.

Next, the controller 9 turns off the power supply to the charger 8 and then issues an instruction to cause the keyless entry device 10 to perform second communication verification and determines whether the communication by the keyless entry device 10 is normally performed or not (S9 in FIG. 3). Then, the second communication between the keyless entry device 10 and the wireless key 13 is performed by the control device 11 of the keyless entry device 10.

When it is determined from the result of the second communication verification by the keyless entry device 10 that the communication verification of the keyless entry device 10 can be performed (YES in S9 of FIG. 3), the following process is performed. In this case, the controller 9 can recognize that failure occurs in the communication of the keyless entry device 10 when the power supply to the charger 8 is turned on and the communication of the keyless entry device 10 can be normally performed when the power supply to the charger 8 is turned off. Accordingly, since it is verified that the operation failure of the keyless entry device 10 occurs when the wireless key 13 is charged using the charger 8 of the in-vehicle charger 6, the controller 9 does not charge the wireless key 13 while the keyless entry device 10 is utilized.

Specifically, in the subsequent charging operation of the in-vehicle charger 6, the power supply to the charger 8 is turned on only when the keyless entry device 10 cannot be operated, in a case where a vehicle movement state is detected (during operation), that is, where the vehicle is running.

That is, since the wireless key 13 is not charged when an opening/closing of the door 12 or a starting of an engine or the like is performed during stopping of a vehicle, the operation failure of the keyless entry device 10 does not occur. As a result, it is possible to prevent the decrease in the reliability of a vehicle control.

Meanwhile, the detection of the vehicle movement state (operation state) is performed in such a way that the controller 9 receives the presence or absence of a speed pulse from the control device 11 of the keyless entry device 10 (S10 in FIG. 3).

And, the controller 9 turns on the power supply to the charger 8 and charges the wireless key 13 only when it is determined that the vehicle pulse is present (YES in S10 of FIG. 3), that is, when the vehicle is running and the keyless entry device 10 cannot be operated (S11 in FIG. 3).

Further, when the second communication verification of the keyless entry device 10 cannot be performed (NO in S9 of FIG. 3), the following process is performed. Specifically, when it is determined that the communication of the keyless entry device 10 is not normally performed and thus the communication verification cannot be performed even though the second communication verification of the keyless entry device 10 has been performed in a state where the power supply to the charger 8 is turned off, the controller 9 turns on the power supply to the charger 8 (S12 in FIG. 3).

That is, the controller 9 determines that the installation of the wireless key 13 on the charger 8 part is not a factor for causing the operation failure of the keyless entry device 10. At this time, the controller 10 resumes the power supply to the charger 8.

Herein, a step (S12 in FIG. 3) to resume the power supply to the charger 8 is further described in detail. That is, in this step, it is intended to charge the mobile phone when it is determined in the step (S3 in FIG. 3) to detect the device to be charged that not the wireless key 13 but the mobile phone, for example, is installed on the charger 9.

Meanwhile, when it is determined that the wireless key 13 or the device to be charged such as the mobile phone is not opposed to the charger 8 in the step (S4 in FIG. 3) to determine the presence or absence of the device to be charged, the process is ended (S13 in FIG. 3).

As described above, in the in-vehicle charger of the present embodiment, the controller turns off the power supply to the charger from an on-state and then causes the keyless entry device to perform the second communication verification. When it is determined that the communication verification of the keyless entry device can be performed, it is determined that the communication failure of the keyless entry device is caused due to the wireless key in a state of being charged.

Therefore, in the subsequent charging operation, the power supply to the charger is turned on only when the keyless entry device cannot be operated, in a case where a vehicle movement state is detected (during operation), that is, where the vehicle is running.

That is, since the wireless key is not charged when an opening/closing of the door or a starting of an engine or the like is performed during stopping of a vehicle, the operation failure of the keyless entry device does not occur. As a result, it is possible to prevent the decrease in the reliability of a vehicle control.

Accordingly, the present invention is expected to be utilized as the in-vehicle charger.

Second Embodiment

A second embodiment is partially different from the above-described first embodiment in an operation of the in-vehicle charger. Hereinafter, an operation of the in-vehicle charger is mainly described and an arrangement and function block configuration of the in-vehicle charger are the same as those of the first embodiment shown in FIG. 1 and FIG. 2 and therefore a duplicated description thereof is omitted.

In the second embodiment, similar to the first embodiment described above, it is assumed that the wireless key 13 of the keyless entry device 10 is charged, as an example of the mobile device. When the wireless key 13 of the keyless entry device 10 is charged, the wireless key 13 is opposed to the charger 8 of the in-vehicle charger 6. The charger 6 includes a detection unit to detect an installation state of the device (the wireless key 13 as an example of mobile device in this present embodiment) to be charged.

Figure 4:
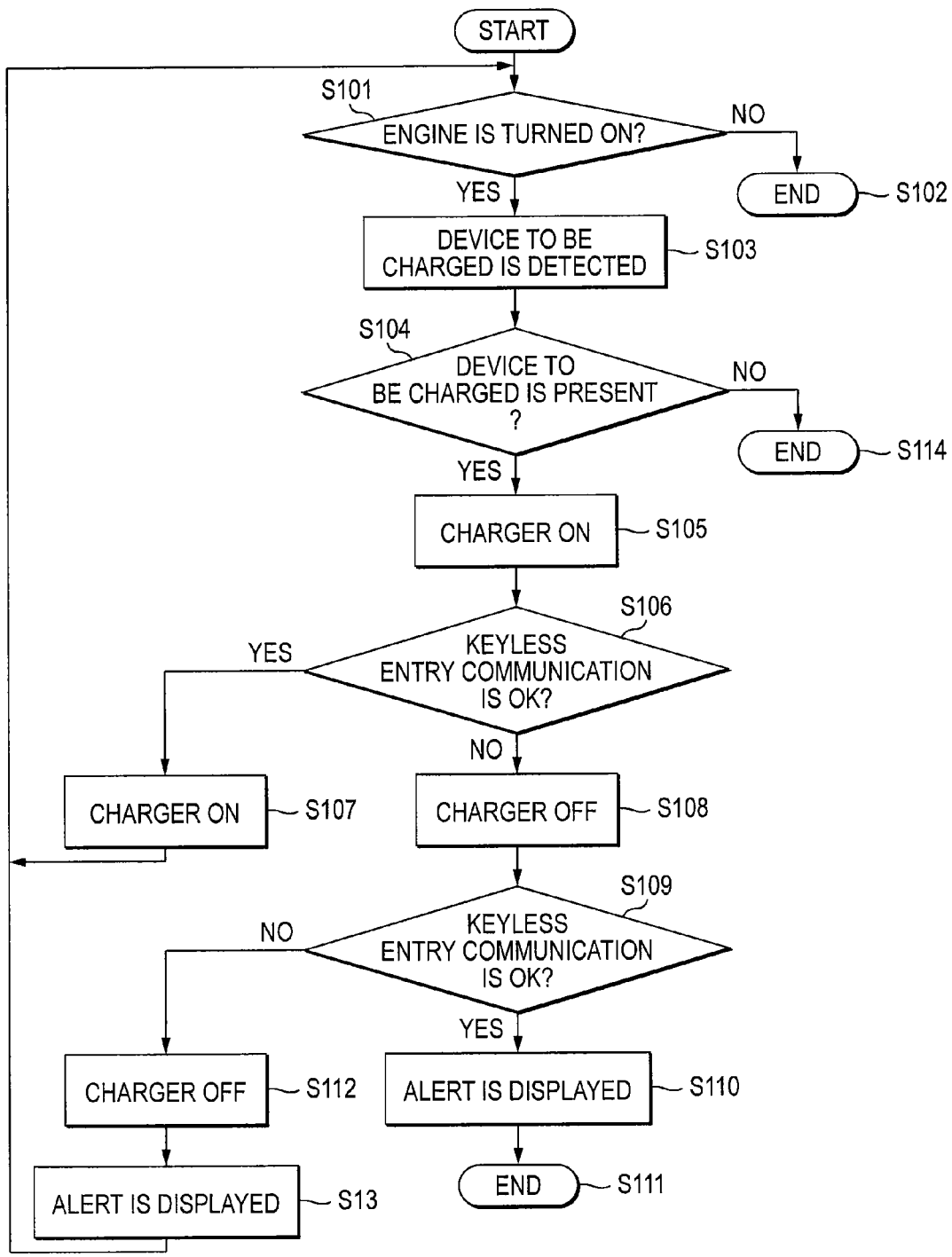
FIG. 4 is a flowchart showing an operation of an in-vehicle charger according to a second embodiment.

In this case, the controller 9 of the in-vehicle charger 6 first obtains starting information of an engine from the control device 11 of the keyless entry device 10 (S101 in FIG. 4).

At this time, when the engine is not running, the mobile device cannot be charged using the in-vehicle charger 6 and the process is ended (S102 in FIG. 4).

In contrast, when the engine is running, the charger 8 of the in-vehicle charger 6 detects an installation state of the device (the wireless key 13 as an example of mobile device in this present embodiment) to be charged relative to the charger 8 part by a detection unit (S103 in FIG. 4).

For example, the detection unit includes elongated loop-shaped position detection coils at predetermined intervals on X axis and Y axis and a pulse signal is inputted to the positional detection coils at a predetermined timing. The position detection coil to which the pulse signal is inputted excites a charging coil of the charger 8 when the mobile device (as an example of the device to be charged) is opposed to the charger 8. The excited charging coil outputs an echo signal to the position detection coil by energy of current flowing therethrough. In this way, the detection unit is configured to detect approaching of the charging coil to the position detection coil and a placing position of the charging coil on the detection unit.

When it is determined by the above detection that the mobile device (as an example of the device to be charged) is opposed to the charger 8 (YES in S104 of FIG. 4), the controller 9 of the in-vehicle charger 6 turns on the power supply to the charger 8 (S105 in FIG. 4) and issues an instruction to cause the keyless entry device 10 to perform first communication verification. By doing so, the controller 9 determines whether the communication by the keyless entry device 10 is normally performed or not (S106 in FIG. 4).

Then, the communication between the keyless entry device 10 and the wireless key 11 is performed by the control device 11 of the keyless entry device 10.

When it is determined that the communication verification of the keyless entry device 10 can be performed (YES in S106 of FIG. 4), the controller 9 of the in-vehicle charger 6 turns on the power supply to the charger 8 (S107 in FIG. 4).

That is, since it is verified by the communication verification operation that an operation failure of the keyless entry device 10 does not occur even when the mobile device such as the wireless key 13 is charged using the charger 8 of the in-vehicle charger 6, such a charging is continuously performed by instruction of the controller 9.

In contrast, when it is determined that the communication verification of the keyless entry device 10 cannot be performed (NO in S106 of FIG. 4), the following process is performed. Specifically, when it is determined that the communication of the keyless entry device 10 is not normally performed and thus the communication verification cannot be performed even though the communication between the keyless entry device 10 and the wireless key 13 has been performed by the control device 11 of the keyless entry device 10, the controller 9 of the in-vehicle charger 6 turns off the power supply to the charger 8 (S108 in FIG. 4).

That is, since it is verified that the operation failure of the keyless entry device 10 occurs when the mobile device (as an example of the device to be charged) such as the wireless key 13 is charged using the charger 8 of the in-vehicle charger 6, the controller 9 turns off such a charging.

Next, the controller 9 turns off the power supply to the charger 8 and then issues an instruction to cause the keyless entry device 10 to perform second communication verification and determines whether the communication by the keyless entry device 10 is normally performed or not (S109 in FIG. 4). Then, the second communication between the keyless entry device 10 and the wireless key 13 is performed by the control device 11 of the keyless entry device 10.

When it is determined from the result of the second communication verification by the keyless entry device 10 that the communication verification of the keyless entry device 10 can be performed (YES in S109 of FIG. 4), the following process is performed. In this case, the controller 9 is configured to cause the display unit 7 to display an alert for the installation state of the wireless key 13 since there is a possibility that the wireless key 13 of the keyless entry device 10 is installed on the charger 8 part (S110 in FIG. 4). Notification of the alert for the installation state of the wireless key may be performed by other method such as an alarm sound, in addition to displaying the alert.

That is, the controller 9 determines that the operation failure of the keyless entry device 10 is caused due to the installation of the wireless key 13 of the keyless entry device 10 on the charger 8 part. At this time, the controller 9 does not resume the power supply to the charger 8 and the process is ended (S111 in FIG. 4).

Further, when the second communication verification of the keyless entry device 10 cannot be performed (NO in S109 of FIG. 4), the following process is performed. Specifically, when it is determined that the communication of the keyless entry device 10 is not normally performed and thus the communication verification cannot be performed even though the second communication verification of the keyless entry device 10 has been performed in a state where the power supply to the charger 8 is turned off, the controller 9 turns on the power supply to the charger 8 (S112 in FIG. 4).

That is, the controller 9 determines that the installation of the wireless key 13 on the charger 8 is not a factor for causing the operation failure of the keyless entry device 10. At this time, the controller 10 resumes the power supply to the charger 8.

At this time, the controller 9 is configured to cause the display unit 7 to display an alert for the operation failure of the keyless entry device 10 (S113 in FIG. 4). Here, notification of the alert for the operation failure of the keyless entry device may be performed by other method such as an alarm sound, in addition to displaying the alert.

Meanwhile, when it is determined that the wireless key 13 or the device to be charged such as the mobile phone is not opposed to the charger 8 in the step (S104 in FIG. 4) to determine the presence or absence of the device to be charged, the process is ended (S114 in FIG. 4).

As described above, in the in-vehicle charger of the present embodiment, the controller turns on the power supply to the charger and causes the keyless entry device to perform first communication verification when an installation state of the device to be charged relative to the charger part is detected by the detection unit and the controller turns on the power supply to the charger when it is determined that the communication verification of the keyless entry device can be performed. Therefore, by turning on the power supply to the charger, the communication failure of the keyless entry device does not occur. As a result, it is possible to prevent the decrease in the reliability of a vehicle control.

Accordingly, the present invention is expected to be utilized as the in-vehicle charger.

Although the present invention has been described in detail with reference to particular illustrative embodiments, the present invention is not limited to the illustrative embodiments and it is obvious to those skilled in the art that the illustrative embodiments can be variously modified and combined without departing a spirit and a scope of the present invention.

This application is based upon Japanese Patent Application (Patent Application No. 2011-184414 and Patent Application No. 2011-184415) filed on Aug. 26, 2011 and the contents of which are incorporated herein by reference.

INDUSTRIAL APPLICABILITY

The present invention has an effect to prevent a decrease in the reliability of a vehicle control and is useful as an in-vehicle charger to be mounted to a vehicle.

DESCRIPTION OF REFERENCE NUMERALS AND SIGNS 1 vehicle body
2 vehicle interior
3 steering wheel
4 front seat
5 rear seat
6 in-vehicle charger
7 display unit
8 charger
9 controller
10 keyless entry device
11 control device
12 door
13 wireless key
14 transceiver
15 antennas
16 battery

The invention claimed is:

1. An in-vehicle charger comprising:
a charger that charges a device to be charged including a wireless key of a keyless entry device;
a controller connected to the charger; and
a detection unit connected to the controller and that detects an installation state of the device to be charged relative to the charger,
wherein the controller turns on power supply to the charger and controls the keyless entry device to perform first communication verification when the installation state of the device to be charged relative to the charger is detected by the detection unit; and
wherein the controller turns on the power supply to the charger when it is determined that the communication verification of the keyless entry device has been performed,
wherein the controller turns off the power supply to the charger when it is determined that the communication verification of the keyless entry device has not been performed,
wherein the controller controls the keyless entry device to perform second communication verification after turning off the power supply to the charger, and
wherein the controller issues an alert for an installation state of the wireless key relative to the charger when it is determined by the second communication verification of the keyless entry device that the communication verification of the keyless entry device has been performed.

2. The in-vehicle charger according to claim 1, wherein the controller issues the alert for the installation state of the wireless key relative to the charger part and then turns off the power supply to the charger.

3. The in-vehicle charger according to claim 1, wherein the alert for the installation state of the wireless key relative to the charger part is performed by a display unit connected to the controller.

4. An in-vehicle charger comprising:
a charger that charges a device to be charged including a wireless key of a keyless entry device;
a controller connected to the charger; and
a detection unit connected to the controller and that detects an installation state of the device to be charged relative to the charger,
wherein the controller turns on power supply to the charger and controls the keyless entry device to perform first communication verification when the installation state of the device to be charged relative to the charger is detected by the detection unit; and
wherein the controller turns on the power supply to the charger when it is determined that the communication verification of the keyless entry device has been performed,
wherein the controller turns off the power supply to the charger when it is determined that the communication verification of the keyless entry device has not been performed,
wherein the controller controls the keyless entry device to perform second communication verification after turning off the power supply to the charger, and
wherein the controller turns on the power supply to the charger and issues an alert for an operation failure of the keyless entry device when it is determined by the second communication verification of the keyless entry device that the communication verification of the keyless entry device has not been performed.

5. The in-vehicle charger according to claim 4, wherein the alert for the operation failure of the keyless entry device is performed by a display unit connected to the controller.

* * * * *